United States Patent [19]

Ainsworth et al.

[11] Patent Number: 5,489,650

[45] Date of Patent: Feb. 6, 1996

[54] COMPATIBILIZATION OF POLYOLEFIN AND CHLORINATED POLYOLEFIN IN THERMOPLASTIC VULCANIZATES WITH HEAT REACTIVE PHENOLIC RESINS

[75] Inventors: Oliver C. Ainsworth; Thomas J. Hives, Jr., both of Baton Rouge, La.

[73] Assignee: The Dow Chemical Company, Midland, Mich.

[21] Appl. No.: 354,339

[22] Filed: Dec. 12, 1994

[51] Int. Cl.$^6$ ............................ C08L 23/26; C08L 23/04; C08L 23/10; C08L 61/06

[52] U.S. Cl. ............................ 525/240; 525/134; 525/144; 525/151

[58] Field of Search ................................. 525/240, 134, 525/144, 151

[56] References Cited

U.S. PATENT DOCUMENTS 4,271,049  6/1981  Coran et al. ............................ 260/4 R Primary Examiner—W. Robinson H. Clark

[57] ABSTRACT

Thermoplastic vulcanizate compositions, comprising blends of dynamically vulcanized chlorinated polyolefin rubber, crystalline polyolefin resin, and heat reactive phenolic resin, having improved properties are disclosed.

17 Claims, No Drawings

COMPATIBILIZATION OF POLYOLEFIN AND CHLORINATED POLYOLEFIN IN THERMOPLASTIC VULCANIZATES WITH HEAT REACTIVE PHENOLIC RESINS

The present invention relates to improved polymer blends of a dynamically vulcanized chlorinated polyolefin and a polyolefin resin.

BACKGROUND OF THE INVENTION

Blends of dynamically vulcanized chlorinated polyolefins and polyolefin resins are known. For example, see U.S. Pat. Nos. 4,910,245, 4,978,703 and 4,978,716. Thermoplastic vulcanizate (TPV) materials used in injection molding processes have shown a need for physical property improvement particularly in the areas of hot melt strength, tensile strength, elongation and tear strength. Improvement in these areas is necessary for supplying molded parts to the automotive industry.

SUMMARY OF THE INVENTION

It has been discovered that thermoplastic vulcanizates exhibiting improved physical properties, such as increased tensile strength and increased elongation, can be produced by the addition of a heat reactive phenolic resin to a blend of a dynamically vulcanized chlorinated polyolefin and a polyolefin resin thereby forming a compatibilized polymer composition. The phenolic resin is added to the blend after dynamic vulcanization has occurred so as not to interfere with the curing mechanism. During the dynamic vulcanization process there is some bond breakage due to the effects of heat and shear that causes some unsaturation in both the chlorinated polyolefin and the polyolefin resin. It is believed that the heat reactive phenolic resins act as tie molecules by reacting with both the unsaturated chlorinated polyolefin and the unsaturated polyolefin resin.

Elastoplastic compositions of the invention are compositions comprising blends of thermoplastic crystalline polyolefin resin, preferably polypropylene, in an amount sufficient to impart thermoplasticity to the composition, cured chlorinated polyolefin rubber, preferably chlorinated polyethylene rubber, in an amount sufficient to impart rubberlike elasticity to the composition and a heat reactive phenolic resin. The chlorinated polyolefin rubber is cured with a cure package comprising a basic material and 2,5-dimercapto 1,3,4-thiadiazole or a derivative thereof.

DESCRIPTION OF THE PREFERRED EMBODIMENT

The use of phenolic resins as curatives for EPDM rubber is taught in U.S. Pat. No. 4,311,628. This curing mechanism includes the incorporation of a Lewis acid material such as zinc chloride. In the present invention the phenolic resin does not act as a curative for the chlorinated polyolefin rubber, being added to the composition after the crosslinking of the chlorinated polyolefin has been accomplished, but rather acts as a compatibilizer between the thermoplastic crystalline polyolefin resin and the dynamically vulcanized chlorinated polyolefin rubber. Additionally, the use of zinc chloride in a chlorinated polyolefin rubber crosslinking mechanism causes dehydrochlorination and is to be avoided.

Phenolic resins useful in the practice of the instant invention may be made by condensation of halogen substituted phenol, $C_1$–$_{10}$ alkyl substituted phenol, or unsubstituted phenol with an aldehyde, preferably formaldehyde, in an alkaline medium or by condensation of bifunctional phenoldialcohols. Dimethylol phenols substituted in the para position with $C_5$–$C_{10}$ alkyl groups are preferred with dimethylol-p-octylphenol being the most preferred. Such phenolic resins are available from Schenectady Chemical Co. as SP-1045, SP-1055 and SP-1056 with SP-1045 being most preferred.

Useful compatibilized polymer compositions comprise blends of about 15–85 parts by weight of thermoplastic crystalline polyolefin resin, about 85–15 parts by weight of chlorinated polyolefin rubber per 100 total parts by weight of polyolefin resin and rubber and from about 0.1 to about 5.0 parts of heat reactive phenolic resin per 100 parts of chlorinated polyolefin rubber. Preferred compositions comprise blends of about 25–75 parts by weight of polyolefin resin, about 75–25 parts by weight of chlorinated polyolefin rubber per 100 total parts by weight of polyolefin resin and rubber, and from about 0.3 to about 3 parts of heat reactive phenolic resin per 100 parts of chlorinated polyolefin rubber. More preferred compositions contain polyolefin resin in amounts not exceeding 50 weight percent of the total composition. Other ingredients such as stabilizers, plasticizers, fillers, pigments and other additives known to those skilled in the art of processing chlorinated polyolefin rubbers or dynamically vulcanized blends of such rubbers and crystalline polyolefin resins may be used as desired.

The thermoplastic elastomers or vulcanizates of the present invention are suitably cured with a cure package comprising a basic material and 2,5-dimercapto -1,3,4-thiadiazole or a derivative thereof. These cure packages are disclosed in U.S. Pat. Nos. 4,128,510 and 4,288,576, the teachings of which are incorporated herein by reference.

Illustrative derivatives of 2,5-dimercapto -1,3,4-thiadiazole include:

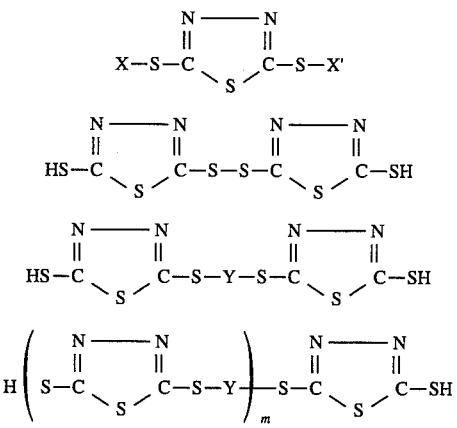

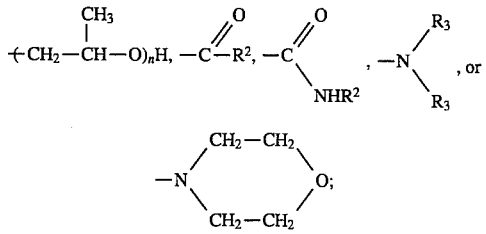

wherein X is a substituent selected from hydrogen, ——CRR'OH, ——$(CH_2$——CH——$O)_n$H, where m is an integer of from 2 to 10; n is an integer from 1 to 5; R and R' are selected from hydrogen, alkyl groups containing 1–8 carbon atoms, and aryl, alkaryl or aralkyl groups containing 6 to 8 carbon atoms; $R^2$ is an alkyl group containing 1–17 carbon atoms, an aryl group containing one or two rings, an alkaryl group containing 7–14 carbon atoms, an aralkyl group containing 7–8 carbon atoms or a cyclohexyl group; and $R^3$ is an alkyl group containing 1-8 carbon atoms. $X'$ can be the same as X with the exception of hydrogen and Y is zinc, lead,

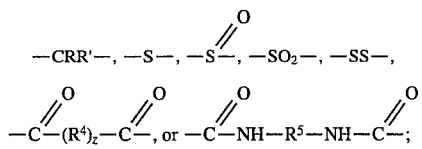

where $R^4$ is an alkylene or alkenylene group containing 1-8 carbon atoms, or a cycloalkylene, arylene or a alkarylene group containing 6-8 carbon atoms; z is 0 or 1; and $R^5$ is an alkylene group containing 2-8 carbon atoms or a phenylene, methylphenylene or methylenediphenylene group.

Basic materials suitable for use in conjunction with derivatives of 2,5-dimercapto-1,3,4-thiadiazole include inorganic materials such as basic metal oxides and hydroxides and their salts with weak acids, such as, for example, magnesium hydroxide, magnesium oxide, calcium oxide, calcium hydroxide, barium oxide, barium carbonate, sodium phenoxide and sodium acetate. These basic materials also serve as heat stabilizers for chlorinated polyethylene. Thus, they are beneficially admixed with the chlorinated polyethylene before the polymer blend is converted to a heat-plastified admixture rather than in conjunction with the thiadiazole derivative. Additional basic material may, if desired, be added together with the thiadiazole derivative. Other basic materials may also be used so long as they do not promote degradation of one of the components of the blend or deactivate the vulcanizing materials. The basic material is preferably magnesium oxide or magnesium hydroxide.

Activator materials suitable for use in conjunction with 2,5-dimercapto-1,3,4-thiadiazole include at least amines and salts of amines, and the condensation product of aniline and at least one mono-aldehyde containing one to seven carbon atoms.

In one preferred embodiment, the ingredients, except the thiadiazole cure package, are mixed at a temperature sufficient to soften the polyolefin resin or, more commonly at a temperature above its crystalline melting point. After a mixing period, the cure package comprising a basic material and 2,5-dimercapto 1,3,4-thiadiazole or a derivative thereof is added and mixing continued for an additional amount of time sufficient to fully effect curing of the chlorinated polyolefin rubber. Then the heat reactive phenolic resin is added and mixing continued to disperse the phenolic resin in the dynamically vulcanized blend of crystalline polyolefin resin and chlorinated polyolefin rubber. Mixing may be satisfactorily accomplished in an internal mixer, in a compounding extruder or on a two roll mill.

The preferred thermoplastic crystalline polyolefin resin is polypropylene and the preferred chlorinated polyolefin rubber is chlorinated polyethylene having a chlorine content of from about 20 to about 40 percent. Most preferred chlorine content is from about 25 to about 42 percent.

EXAMPLE 1-3

To illustrate the invention, compositions as shown in Table 1 below were mixed in either a two load Banbury TPV process or a one load Banbury TPV process. In the two load process a TPV containing 50 percent polyolefin resin, such as polypropylene, was made by melt mixing the chlorinated polyolefin rubber, such as chlorinated polyethylene (CPE), with stabilizers, fillers, plasticizers, and with polypropylene (PP) in a Banbury internal mixer for 5 minutes, at which time the melt temperature had reached 175 deg. C. The thiadiazole curing package was then added to crosslink the CPE and the mixing was continued until the CPE was completely cured, about 3 minutes at 175 deg. C. thus forming a thermoplastic vulcanizate (TPV). The TPV was removed from the Banbury mixer and mixed on a heated two roll mill to insure uniformity. A sheet of TPV was then taken from the two roll mill and sliced into strips to be used as part of the Banbury feed in load 2.

To make a TPV with less than 50 percent of PP, the strips from step 1 were mixed in the Banbury as before with additional CPE, stabilizers, fillers and plasticizers for 5 minutes to a temperature of about 175 deg. C. The thiadiazole cure package was then added to crosslink the additional CPE and mixing was continued for about 3 minutes. After this time the heat reactive phenolic resin was added and mixing continued for about 1 minute. The TPV containing the phenolic resin was then discharged from the Banbury mixer, transferred to a heated two roll mill and then sheeted off the mill. The roll mill sheet was cut into strips, diced and injection molded into 3"×6"×0.25" test plaques on a molding machine.

In the one load process there has to be enough polyolefin resin present to insure that it is the continuous matrix with the rubber dispersed as finely divided particles. The one load process would be selected when possible to reduce TPV manufacturing costs by minimizing labor and mixer time.

In the one load process the TPV was made by melt mixing the desired amounts of CPE, stabilizers, fillers, plasticizers and polypropylene in the Banbury mixer for 5 minutes when the melt temperature reached 175 deg. C. The cure package was then added and mixing continued until all the CPE was cured, i.e., about 3 minutes at 175 deg. C., and then the heat reactive phenolic resin was added and mixing continued for about an additional minute. The TPV containing the phenolic resin was removed from the Banbury mixer and further mixed on a heated two roll mill to insure uniformity. The roll mill sheet was sliced into strips, diced and injection molded into test plaques as before. Control compositions without the phenolic resin were made for comparative purposes. Testing specimens were die cut from the 3"×6"×0.25" plaques and tensile strength and elongation measurements were determined under the conditions of ASTM D412 and tear strength measurements under ASTM D624.

TABLE I

| CPE/PP TPV | | | |
|---|---|---|---|
| | FORMULATION pph* | | |
| | 1 | 2 | 3 |
| Tyrin 3615 | 100 | 100 | 100 |
| Marinco H | 5 | 5 | 5 |
| TSPP | 3 | 3 | 3 |
| Irganox 225 | 1 | 1 | 1 |
| TiO$_2$ R960 | 3 | 3 | 3 |
| Omyacarb UF | 35 | 35 | 35 |
| TOTM | 100 | 100 | 100 |
| Pro-Fax 6723 | 40 | 40 | 40 |
| RD 882A | 1.5 | 1.5 | 1.5 |
| RD 882B | 0.75 | 0.75 | 0.75 |
| SP1045 | 0.00 | 10 | 15 |

*pph - parts per hundred parts of Tyrin ® chlorinated polyethylene

Materials used and their manufacturer are as follows: Tyrin 3615, chlorinated polyethylene, The Dow Chemical Company; Marinco H, magnesium hydroxide, Calgon Corp.; TSPP, phosphate stabilizer, Monsanto Co.; Irganox 225, phenol/phosphite stabilizer, Ciba-Geigy; TiO$_2$ R960, titanium dioxide, SCM Chemicals; Omyacarb UF, calcium carbonate, Omya Inc.; TOTM, trioctyl trimellitate, C. P. Hall Co.; Pro-Fax 6723, polypropylene, Himont; RD 882A, mercapto thiadiazole, R. T. Vanderbilt; RD 882B aliphatic amine, R. T. Vanderbilt; SP-1045 phenolic resin, Schenectady Chemical Co.

Physical properties from the injection molded test plaques are listed in Table II below.

TABLE II

| INJECTION MOLDED TPV | | | |
|---|---|---|---|
| | 1 | 2 | 3 |
| Tensile strength with flow, psi | 789 | 827 | 902 |
| Elongation with flow, % | 145 | 318 | 333 |
| Tensile across flow, psi | 697 | 841 | 839 |
| Elongation across flow, % | 282 | 477 | 520 |

The test data reveal a substantial increase in tensile strength and elongation due to the presence of the phenolic resin.

Examples 4–8

A second set of test plaques was prepared in the manner of Examples 1–3 to determine the effect of small changes in the level of phenolic resin added to the TPVs. Formulations are given in Table 3 below.

TABLE III

| CPE/PP TPV | | | | | |
|---|---|---|---|---|---|
| | Formulation pph* | | | | |
| | 4 | 5 | 6 | 7 | 8 |
| Tyrin 3615 | 100 | 100 | 100 | 100 | 100 |
| Marinco H | 5 | 5 | 5 | 5 | 5 |
| TSPP | 3 | 3 | 3 | 3 | 3 |
| Irganox 225 | 1 | 1 | 1 | 1 | 1 |
| TiO2 R960 | 3 | 3 | 3 | 3 | 3 |
| Omyacarb UF | 35 | 35 | 35 | 35 | 35 |
| TOTM | 100 | 100 | 100 | 100 | 100 |
| Pro-Fax 6723 | 30 | 30 | 30 | 30 | 30 |
| RD 882A | 1.5 | 1.5 | 1.5 | 1.5 | 1.5 |
| RD 882B | 0.75 | 0.75 | 0.75 | 0.75 | 0.75 |
| SP1045 | 0.00 | 1.4 | 2.8 | 4.2 | 5.6 |

*pph - parts per hundred parts of Tyrin ™ chlorinated polyethylene.

The physical properties associated with the changing levels of heat reactive phenolic resin are listed in Table IV below.

TABLE IV

| INJECTION MOLDED TPV | | | | | |
|---|---|---|---|---|---|
| | 4 | 5 | 6 | 7 | 8 |
| Tensile with flow, psi | 581 | 655 | 677 | 679 | 695 |
| Elongation with flow, % | 96 | 119 | 150 | 175 | 207 |
| Tensile across flow, psi | 566 | 616 | 689 | 686 | 722 |
| Elongation across flow, % | 234 | 267 | 304 | 338 | 400 |
| Tear strength with flow, psi | 119 | 133 | 141 | 144 | 148 |
| Tear strength across flow, psi | 130 | 148 | 167 | 165 | 166 |

The tensile strength, elongation, and tear strength of the injected molded test samples showed an increase as a function of phenolic resin content with the largest increases observed between the zero and the part level.

Processability of the various compositions listed in Table 1 and Table 3 was determined by extruding them on a Haake single screw extruder, equipped with a 4" tape die at the following conditions:

Extruder temperature: Rear 190 deg. C. Middle 190 deg. C. Front 190 deg. C.

Die temperature: 190 deg. C.

Screw RPM: 60.

Evaluation of the extruded tapes revealed that the edges were saw-toothed and the surfaces rough in the composition without phenolic resin and that these conditions improved with increasing level of phenolic resin. The samples containing 2 and 3 parts of phenolic resin, in particular, were characterized as having uniform edges and smooth surfaces.

The phenolic resin-modified TPVs have improved elastic properties and make less anisotropic injection molded parts. They also demonstrate improved processability in the extrusion process. These observations demonstrate that the heat reactive phenolic resins act as compatibilizers between chlorinated polyolefin rubbers and crystalline polyolefin resins in TPV compositions.

What is claimed is:

1. A compatibilized polymer composition comprising a blend of a thermoplastic olefin polymer, fully cured chlorinated polyolefin polymer and a heat reactive phenolic compound.

2. A composition as recited in claim 1 wherein said thermoplastic olefin polymer is polypropylene.

3. A composition as recited in claim 1 wherein said chlorinated polyolefin polymer is chlorinated polyethylene.

4. A composition as recited in claim 3 wherein said chlorinated polyethylene has a chlorine content of from about 20 to about 48 percent.

5. A composition as recited in claim 4 wherein said chlorine content is from about 25 to about 42 percent.

6. A composition as recited in claim 1 wherein said heat reactive phenolic compound is a dimethylol phenolic resin.

7. A composition as recited in claim 6 wherein said dimethylol phenolic resin is dimethylol-p-octylphenol.

8. A composition as recited in claim 1 in which said blend comprises about 20–50 parts of thermoplastic olefin polymer and 80–50 parts of cured chlorinated polyolefin polymer based on 100 total parts of said thermoplastic olefin polymer and said chlorinated polyolefin polymer combined.

9. A composition as recited in claim 1 in which the level of said phenolic compound is from about 0.1 parts to about 5 parts based on 100 parts of said chlorinated polyolefin polymer.

10. A method to improve the physical properties of thermoplastic vulcanizates made from thermoplastic olefin polymers and fully cured chlorinated polyolefin polymers by the addition of a heat reactive phenolic resin after dynamic vulcanization has occurred.

11. A method as recited in claim 10 wherein said thermoplastic olefin polymer is polypropylene, 12. A method as recited in claim 10 wherein said chlorinated polyolefin polymer is chlorinated polyethylene.

13. A method as recited in claim 12 wherein said chlorinated polyethylene has a chlorine content of from about 20 to about 48 percent.

14. A method as recited in claim 13 wherein said chlorine content is from about 25 to about 42 percent.

15. A method as recited in claim 10 wherein said phenolic resin is a dimethylol phenolic material.

16. A method as recited in claim 15 wherein said dimethylol phenolic material is dimethylol-p-octylphenol.

17. A method as recited in claim 10 wherein said thermoplastic vulcanizates comprise about 20–50 parts of thermoplastic olefin polymer and about 80–50 parts of cured chlorinated polyolefin polymer based on 100 total parts of said thermoplastic olefin polymer and said chlorinated polyolefin polymer combined.

\* \* \* \* \*